Patented Jan. 19, 1943

2,309,062

UNITED STATES PATENT OFFICE 2,309,062

TREATMENT OF WASTE WATER

William Graham, Long Beach, Calif., assignor to Richfield Oil Corporation, Los Angeles, Calif., a corporation of Delaware No Drawing. Application August 2, 1940, Serial No. 350,152

2 Claims. (Cl. 210—2)

This invention relates to the treatment and purification of waste water, and more particularly to the treatment and purification of waste water from oil refineries and oil wells to prevent or inhibit the growth of various bacteria and vegetation, which, is allowed to propagate, cause objectionable biological reactions and excessive growth of vegetable slimes.

The problem of theatment and purification of waste water from oil refineries, etc., to meet the requirements of local sanitary authorities is a problem well recognized in the art. Bacterial and vegetable growths find, as favorable conditions, water varying in temperature from around 40° F. to 150° F. and pH varying from around 4.5 to 9.0, more or less. In order to prevent or inhibit such growths it has been the practice to treat the waste waters with chlorine, added in sufficient amount to inhibit or prevent such objectionable growths. Considerable study has been given to the use of chlorine for this purpose and to the control of its use, and standard methods of water analysis have been developed which are commonly used to determine the chlorine requirements of different waste waters, particularly the so-called orthotolidine test. This test shows the operator when he has an excess of chlorine which is dissolved in the water and has not been consumed by the bacteria and vegetable life. The ordinary procedure for determining the necessary amount of chlorine to be administered in the treatment of waste water is to add chlorine to a sample of the water until it can be detected in the free state in the water. When this point is reached the operator knows that chlorine has been administered in sufficient quantity to prevent the further growth of undesirable life in the waste water.

The present invention provides an improved method of treating waste waters from oil refineries, etc., in which such objectionable growths can be prevented or inhibited with the use of a greatly reduced amount of chlorine than that heretofore commonly use.

The present invention is based upon the discovery that if waste water contaminated with oily material is first chlorinated, and this chlorinated material then used for treating the balance of the waste water, effective treatment and purification can be effected with a greatly reduced amount of chlorine as compared with the amount commonly used.

The oil-contaminated waste waters which are first chlorinated commonly form only a part of the waste waters requiring treatment. Such oil-contaminated waste waters contain small and varying amounts of organic compounds associated with them, due to the intimate admixture of the waste waters and oils of various kinds from the refinery operations. Some of these organic compounds may be normal constituents of crude oil, while others may be those produced from various refinery operations such as thermal cracking operations, etc. Apparently these oily impurities, or certain of them, react with the initial chlorine to produce chlorinated organic compounds which are far more effective and toxic to bacteria and algae than is chlorine itself. Accordingly, when the chlorinated oil-contaminated waste waters are subsequently admixed with the balance of the waste water to be treated, an effective treatment of the entire waste water can be effected in a particularly advantageous manner, and with far less total chlorine required than that commonly required by the usual method.

While I do not wish to limit myself by any theoretical explanation of the action that takes place, I am led to believe that even small amounts of organic compounds derived from petroleum and present as contaminants of the water form chlorinated compounds which are far more toxic to bacteria and algae than is chlorine itself. These organic products may be only sparingly soluble in water or may be dissolved or emulsified therewith to a greater or less extent. It is probable that they include organic compounds such as phenolic derivatives, basic nitrogen compounds, naphthenic acid derivatives, etc., or it may be that chlorine derivatives of unsaturated organic compounds may be formed. In any event, I have found that the chlorination of the oil-contaminated waste water results in the production of a more effective treating agent, when this water is added to the remainder of the waste water, than when the chlorine is added to the entire body of waste water, according to common practice. I am led to believe that the chlorine derivatives of the organic products present are much more effective in inhibiting the propagation of the undesirable bacteria and algae, which thrive in the untreated water, than is chlorine itself.

In addition to the organic compounds referred to above, the water which is separated from the crude oil at the wells, and which is also oil-contaminated, may contain various amounts of other halogens, such as bromine and iodine, probably in combined form, but which may, under proper conditions, be replaced by chlorine, and which may act upon the bacteria and vegetation in their elemental form, or may also combine with the organic compounds to form toxic compounds.

Among the types of growth which have been bothersome in waste waters from oil refineries, etc., are unidentified bacteria capable of reducing sulfates to sulfides and a black variety of alga (Phaeophyceae), which is frequently found in sewer lines. The former is objectionable because the reduction of sulfates produces hydrogen sulfide; the latter tends to occlude particles of oil which will cause pollution of the water bodies into which the waste water is discharged, such, for example, as the ocean, lakes or streams.

It is accordingly one of the objects of the present invention to control the propagation of undesirable bacteria and algae in waste water disposal lines from oil refineries, etc. It is another object of the invention to utilize the organic compounds of oil-contaminated waste waters from petroleum refineries and petroleum oil fields by preliminary chlorination of such waste water and utilization of the resulting water for treatment of other waste water to effect control of such bacteria and algae.

It is another object of the invention to utilize the chlorinated oil-contaminated waste waters to effect a saving in the amount of chlorine required to control bacterial and algal growth in waste water from oil refineries, etc.

In carrying out the present process the entire amount of chlorine required is advantageously applied to a relatively small part of the total waste waters, but to a part of the waste waters which is contaminated with oily matter and for a length of time sufficient to permit the chlorine to react with organic impurities present to form chlorine derivatives of the organic impurities, and the resulting chlorinated water containing the chlorine derivatives of the organic impurities is then admixed with the remainder of the waste water and advantageously subjected to settling before the total waste water is discharged in a treated condition to a place of disposal.

As illustrating the application and advantages of the invention I will describe the results of tests made on waste waters collected from a group of wells in a California oil field together with waste water from an oil refinery located in the same district. The water from various small units passes through settling ponds to free it to a greater or less extent from oil and other objectionable material and is finally discharged into a sewer line which conveys it to the ocean or to a place of disposal. Practically all of the settling ponds were found impregnated with sulfate-reducing bacteria in which algae would flourish if allowed to do so. A typical analysis of the untreated water is as follows:

Chlorine demand _____ 500 parts per million.
pH _____ 7.8.
Turbidity _____ Turbid.
Odor _____ Disagreeable.
Algae _____ Present A part of the waste water which was contaminated with oil, and which came from the oil refinery, was first treated with chlorine and the resulting chlorinated oil-contaminated waste water was then added to the remainder of the waste water. Only about 14.0% of the total amount of waste water was thus preliminarily treated with the chlorine. The total amount of chlorine, based on the total waste water treated, was only about 11.6% of the amount indicated by the demand, when tested by the ortho-tolidine test. However, this relatively small amount of chlorine, when first applied to the oil-contaminated waste water, resulted in the production of a treated water having the following characteristics:

Residual chlorine content___ 0.1 part per million.
pH _____ 7.6.
Turbidity _____ Clear.
Odor _____ Good.
Algae _____ Trace (but inactive).

It is evident that the chlorine thus used has a greatly increased effectiveness, due, as I believe, to the formation of chlorine compounds of organic matter which are far more toxic than chlorine itself, with the result that the treatment of the entire waste water can be carried out at greatly reduced cost of chlorine treatment.

The present process can be carried out in apparatus which is readily available and such as is commonly used for treating waste water with chlorine; but the preliminary chlorine treatment is applied to a part only of the waste water, and to a part which is contaminated with oily material and for a length of time sufficient to permit the chlorine to react with organic impurities present to form chlorine derivatives of the organic impurities, and the resulting chlorinated oil-contaminated waste water containing the chlorine derivatives of the organic impurities is then admixed with the remainder of the waste water to be treated. Thus, oil-contaminated waste water from the refinery is advantageously first treated with the chlorine to produce a chlorinated oil-contaminated waste water, and the resulting chlorinated material is then admixed with the general waste by suitable methods of mixing. The admixed waste water may advantageously be subjected to a further settling treatment to permit separation of admixed oil before the treated water is discharged to its place of disposal. The separation of admixed oil contained in the treated water is to be facilitated by the treatment described.

While the invention has been more particularly described in connection with the chlorination of oil-contaminated waste water from a refinery, it is also applicable to certain oil-contaminated waters from oil wells in a similar manner.

It will thus be seen that the present invention provides an improved method of treating waste water from oil refineries, etc., in which the chlorination is applied to a part only of the waste water, and particularly to such part of the waste water as is contaminated with oily material and in which the resulting chlorinated water is used to treat the balance of the waste water, with resulting reduction in the total requirements of chlorine from that commonly required for treating the entire amount of waste water.

The improved results are obtained, as I believe, by the chlorination of organic compounds present in the oil-contaminated waste water to produce chlorinated organic compounds which are far more effective when so produced and used than the treatment of the entire waste water with chlorine according to conventional methods.

I claim:

1. The method of purifying waste water from oil refineries and oil wells containing organic impurities with chlorine which comprises subjecting an oil-contaminated portion of the waste water to treatment with the entire amount of chlorine to be used to purify the waste water for a length of time sufficient to permit the chlorine to react with organic impurities present to form chlorine derivatives of the organic impurities, and admixing said portion of the waste water containing the chlorine derivatives of the organic impurities with the remainder of the waste water to be purified, the amount of chlorine added to said portion of the waste water being a small part only of the total requirement for treatment of the total amount of waste water to obtain a desired degree of purification, as indicated by the conventional ortho-tolidine test.

2. The method of purifying waste water from oil refineries and oil wells containing organic impurities which comprises treating an oil contaminated portion of the waste water with chlorine for a length of time sufficient to permit the chlorine to react with organic impurities present to form chlorine derivatives of the organic impurities, and admixing said portion of the waste water containing the chlorine derivatives of the organic impurities with the remainder of the waste water to be purified, the amount of chlorine added to the waste water to obtain a desired degree of purification being a small part only of the total requirement for treatment of the total amount of waste water to obtain such degree of purification, as indicated by the conventional ortho-tolidine test.

WILLIAM GRAHAM.

CERTIFICATE OF CORRECTION.

Patent No. 2,309,062.  January 19, 1943.

WILLIAM GRAHAM.

It is hereby certified that error appears in the printed specification of the above numbered patent requiring correction as follows: Page 1, first column, line 6, for "is" read --if--; line 9, for "theatment" read --treatment--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents,